US012409789B1

(12) United States Patent
Wang et al.

(10) Patent No.: US 12,409,789 B1
(45) Date of Patent: Sep. 9, 2025

(54) BIKE RACK WITH POSITIONING FRAME FOLDING AND SECURING STRUCTURE

(71) Applicant: KING RACK INDUSTRIAL CO., LTD., Taichung (TW)

(72) Inventors: Chiu Kuei Wang, Taichung (TW); Hugues Espesset, Saint Juery (FR); Frederic Girod, Saint Juery (FR)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/767,857

(22) Filed: Jul. 9, 2024

(30) Foreign Application Priority Data

Mar. 7, 2024 (TW) .................................. 113108378

(51) Int. Cl.
*B60R 9/10* (2006.01)
*B60R 9/04* (2006.01)

(52) U.S. Cl.
CPC . *B60R 9/10* (2013.01); *B60R 9/04* (2013.01)

(58) Field of Classification Search
CPC .... B60R 9/06; B60R 9/10; B60R 9/04; B60R 9/045; B60R 2011/0082; B60R 2011/0087
USPC .......... 211/17; 224/545, 547, 548, 552, 553, 224/554, 567
See application file for complete search history.

(56) References Cited

U.S. PATENT DOCUMENTS

| | | | |
|---|---|---|---|
| 5,794,828 A * | 8/1998 | Colan ....................... | B60R 9/10 224/924 |
| 9,096,182 B1 * | 8/2015 | Roth ....................... | B60R 11/00 |
| 9,555,744 B1 * | 1/2017 | Roth ....................... | B60R 9/10 |
| D813,784 S * | 3/2018 | Larsson ..................... | D12/406 |
| 10,046,712 B1 * | 8/2018 | Foley ....................... | B60R 9/06 |
| 10,093,243 B2 * | 10/2018 | Shen ....................... | B60R 9/10 |
| 10,183,627 B1 * | 1/2019 | Liu ......................... | B60R 9/06 |
| 10,967,805 B2 * | 4/2021 | Wang ....................... | B60R 9/10 |
| 11,148,604 B2 * | 10/2021 | Wang ..................... | B60R 9/045 |
| 11,648,885 B2 * | 5/2023 | Wang ....................... | B60R 9/10 224/488 |
| D1,016,723 S * | 3/2024 | Wang ....................... | D12/407 |
| 2008/0164292 A1 * | 7/2008 | Farney ..................... | B60R 9/06 224/324 |
| 2008/0230579 A1 * | 9/2008 | Wang ....................... | B60R 9/10 224/400 |
| 2009/0120984 A1 * | 5/2009 | Sautter ..................... | B60R 9/10 224/532 |

(Continued)

FOREIGN PATENT DOCUMENTS

DE 102009016529 A1 * 10/2010 ............... B60R 9/06

*Primary Examiner* — Jennifer E. Novosad
(74) *Attorney, Agent, or Firm* — Ying-Ting Chen; Law Office of Michael Chen

(57) ABSTRACT

A bike rack includes a base with a U-shaped bar and a support frame. The support frame is mounted a top of the U-shaped bar. A positioning frame is pivotably connected two connection plates on the support frame. Each connection plate is connected to a limiter by a quick-release device. Each limiter includes a vertical groove and a horizontal groove. The vertical groove accommodates one of two extensions of the positioning frame when the positioning frame is positioned upright. By operating the quick-release devices, the positioning frame is either fitted in the vertical groove or the horizontal groove. The bike rack can securely fasten bicycles and is not wobble or unstable while driving.

5 Claims, 11 Drawing Sheets

(56) References Cited

U.S. PATENT DOCUMENTS

| | | | |
|---|---|---|---|
| 2009/0230162 A1* | 9/2009 | Wang | B60R 9/10 |
| | | | 224/519 |
| 2009/0236382 A1* | 9/2009 | Sautter | B60R 9/06 |
| | | | 224/497 |
| 2009/0302078 A1* | 12/2009 | Wang | B60R 9/10 |
| | | | 224/532 |
| 2010/0124477 A1* | 5/2010 | Wang | B60R 3/02 |
| | | | 414/462 |
| 2010/0230455 A1* | 9/2010 | Wang | B60R 9/06 |
| | | | 224/533 |
| 2010/0320247 A1* | 12/2010 | Wang | B60R 9/10 |
| | | | 224/567 |
| 2013/0062385 A1* | 3/2013 | Pedrini | B60R 9/10 |
| | | | 224/501 |
| 2014/0027484 A1* | 1/2014 | Loken | B60R 9/06 |
| | | | 224/521 |
| 2014/0291373 A1* | 10/2014 | Wang | B60R 9/06 |
| | | | 224/549 |
| 2015/0076200 A1* | 3/2015 | Pedrini | B60R 9/10 |
| | | | 224/570 |
| 2017/0349111 A1* | 12/2017 | Ramsdell | B60R 9/06 |
| 2018/0001830 A1* | 1/2018 | Olaison | B60R 9/10 |
| 2018/0072237 A1* | 3/2018 | Kuschmeader | B60R 9/10 |
| 2019/0270423 A1* | 9/2019 | Hutton | B60R 9/06 |
| 2020/0156724 A1* | 5/2020 | Kuschmeader | B60R 9/06 |
| 2022/0097617 A1* | 3/2022 | Wang | B60R 9/10 |
| 2023/0202403 A1* | 6/2023 | Wang | B60R 9/06 |
| | | | 224/549 |

\* cited by examiner

BIKE RACK WITH POSITIONING FRAME FOLDING AND SECURING STRUCTURE

BACKGROUND OF THE INVENTION

1. Fields of the Invention

The present invention relates to a bike rack, and more particularly, to a structure for folding and securing the positioning frame of a bike rack.

2. Descriptions of Related Art

Cycling is a very popular sport, and bicycle-related equipment has diversified in its development. Among these, bike racks that can be used to secure bicycles to cars are particularly popular.

Currently, bike racks are divided into two types: roof-mounted bike racks and rear-mounted bike racks. Rear-mounted bike racks can be attached to different types of vehicle and are not affected by height restrictions such as underpasses and tunnels, making them more favored by consumers.

However, when using a bike rack, consumers are concerned about whether the bike rack can securely fasten the bicycle and do not want the bike rack to wobble or be unstable while driving.

Therefore, as proposed by the applicant in Taiwan Utility Model No. M625318, a folding structure for a bike rack auxiliary frame can provide a labor-saving and convenient-to-operate bike rack. However, in the aforementioned case, the limiters used to fix the positioning frame are of an integrated structure, which can cause the positioning frame to wobble during vehicle movement, easily distracting the driver.

The present invention intends to provide a bike rack with auxiliary frame folding and securing structure to eliminate the shortcomings mentioned above.

SUMMARY OF THE INVENTION

The present invention relates to a bike rack and comprises a base, a positioning frame, and two sets of quick-release devices. The base includes a U-shaped bar and a support frame, wherein the U-shaped bar is horizontally positioned and the support frame is mounted a top of the U-shaped bar. The support frame is a quadrilateral frame with connection plates symmetrically positioned on two sides thereof. Each of the connection plates has an upper connection post and a pin, and a limiter is connected to each connection plate. Each limiter is located in the connection plate corresponding thereto and has an upper connection hole located corresponding to the upper connection post, and a lower connection hole located corresponding to the pin. Each limiter has a vertical groove and a horizontal groove, wherein the vertical groove accommodates the positioning frame. The upper connection hole is defined through an inner end of the horizontal groove.

The positioning frame is U-shaped and includes a U-shaped section and two extensions respectively extending from two distal ends of the U-shaped section. Each extension has two lock holes and a perforation which is located between the two lock holes. A spacer is attached to an outside of each extension of the positioning frame. Two screws pass through the spacer and are connected to the lock holes of each extension of the positioning frame. Each extension of the positioning frame has a pin hole located below a lowest one of the two lock holes. Each set of quick-release devices is engaged with the limiter corresponding thereto, and includes a lever and a connection shaft. The lever has an operation end and a protruding flange. The connection shaft is connected to the protruding flange. Each of the two extensions of the positioning frame is accommodated in the vertical groove of the limiter corresponding thereto. The connection shaft of each quick-release device passes through the perforation and extends through the upper connection post, and the pin is inserted into the pin holes of the positioning frame. A nut is screwed onto a distal end of each connection shaft. When the lever is pivoted, the protruding flange fits against the spacer to secure the positioning frame to the base.

Preferably, the base has at least one bike supporter.

Preferably, each positioning frame includes a sleeve mounted thereto. The sleeve has two protrusions, and an elastic cord is attached to the two protrusions. In a locked state, the elastic cord is looped over the operation end of the lever to secure the lever.

Preferably, the base is adapted to be to a connection tube.

Preferably, each of the two extensions of the positioning frame is accommodated horizontally in the horizontal groove of the limiter corresponding thereto. The positioning frame is positioned within the limiters by the quick-release devices.

The primary object of the present invention is to provide a folding and securing structure for the positioning frame of a bike rack. This structure includes limiters installed on the positioning frame that secures the bicycle to reduce wobbling. The limiters are fitted onto connection plates on the support frame, ensuring that the positioning frame remains stable and does not excessively wobble during vehicle movement.

The features and benefits of the present invention are briefly summarized as follows:

The present invention allows the positioning frame to be quickly connected to the base using quick-release devices, providing convenience in use. Additionally, the design of the limiters ensures that the positioning frame does not wobble or become unstable during vehicle movement.

The present invention includes at least one bike supporters for holding bicycles as needed, achieving the advantage of convenient use.

The present invention will become more obvious from the following description when taken in connection with the accompanying drawings which show, for purposes of illustration only, a preferred embodiment in accordance with the present invention.

DETAILED DESCRIPTION OF THE
PREFERRED EMBODIMENT

Figure 1:
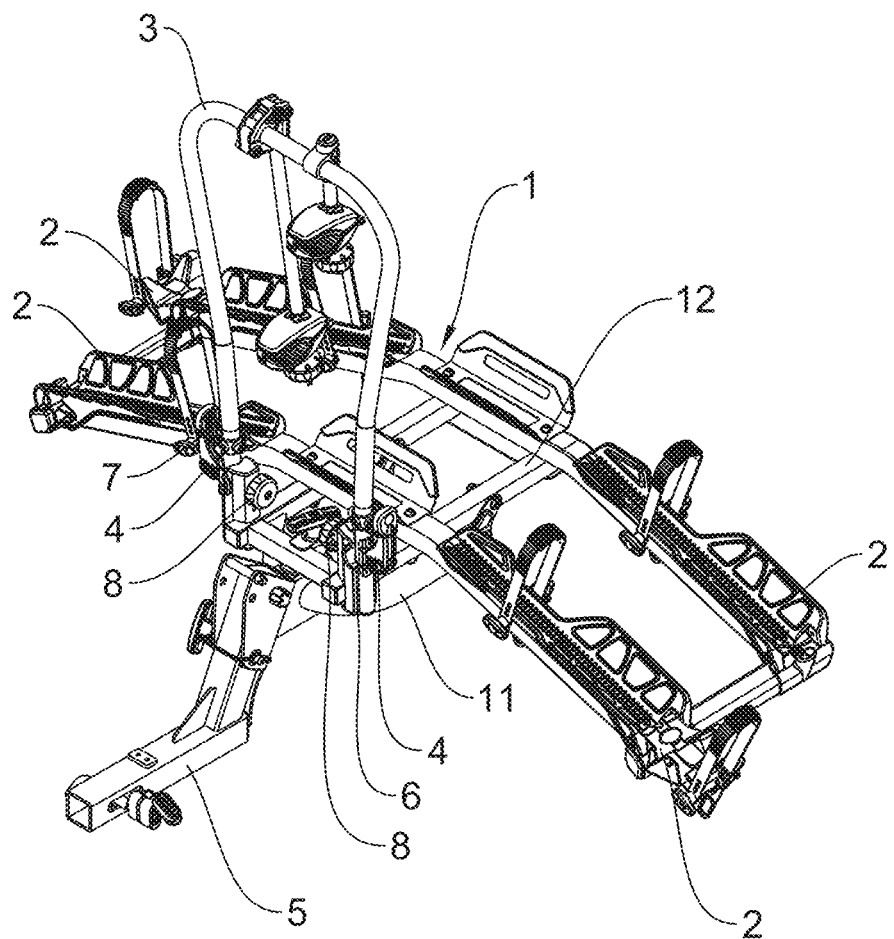
FIG. 1 is a perspective view to show the actual usage state of the present invention.
Figure 2:
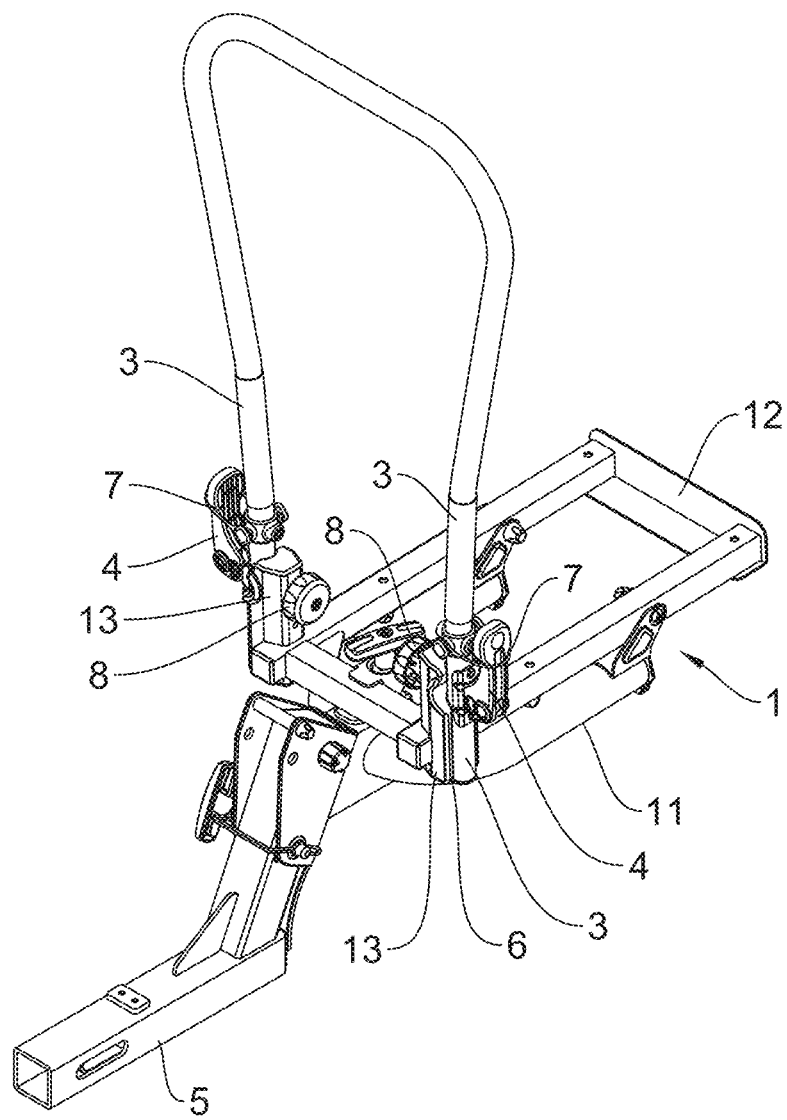
FIG. 2 a perspective view to show the bike rack of the present invention.

Referring to FIGS. 1 and 2, the bike rack of the present invention comprises a base (1), at least one bike supporters (2), a positioning frame (3), and two sets of quick-release devices (4).

As shown in FIGS. 1 to 7, the base (1) includes a U-shaped bar (11) and a support frame (12), wherein the U-shaped bar (11) is horizontally positioned and the support frame (12) is mounted a top of the U-shaped bar (11). The support frame (12) is a quadrilateral frame with connection plates (13) symmetrically positioned on two sides thereof. The base (1) includes a connection tube (5) which is able to be connected to a vehicle (not shown).

As shown in FIG. 1, two sets of bike supporters (2) are connected to the support frame (12) of the base (1). The bike supporters (2) provide mounts for the front and rear wheels of bicycles. The bike supporters (2) can be either fixed or foldable, depending on the selection.

Figure 3:
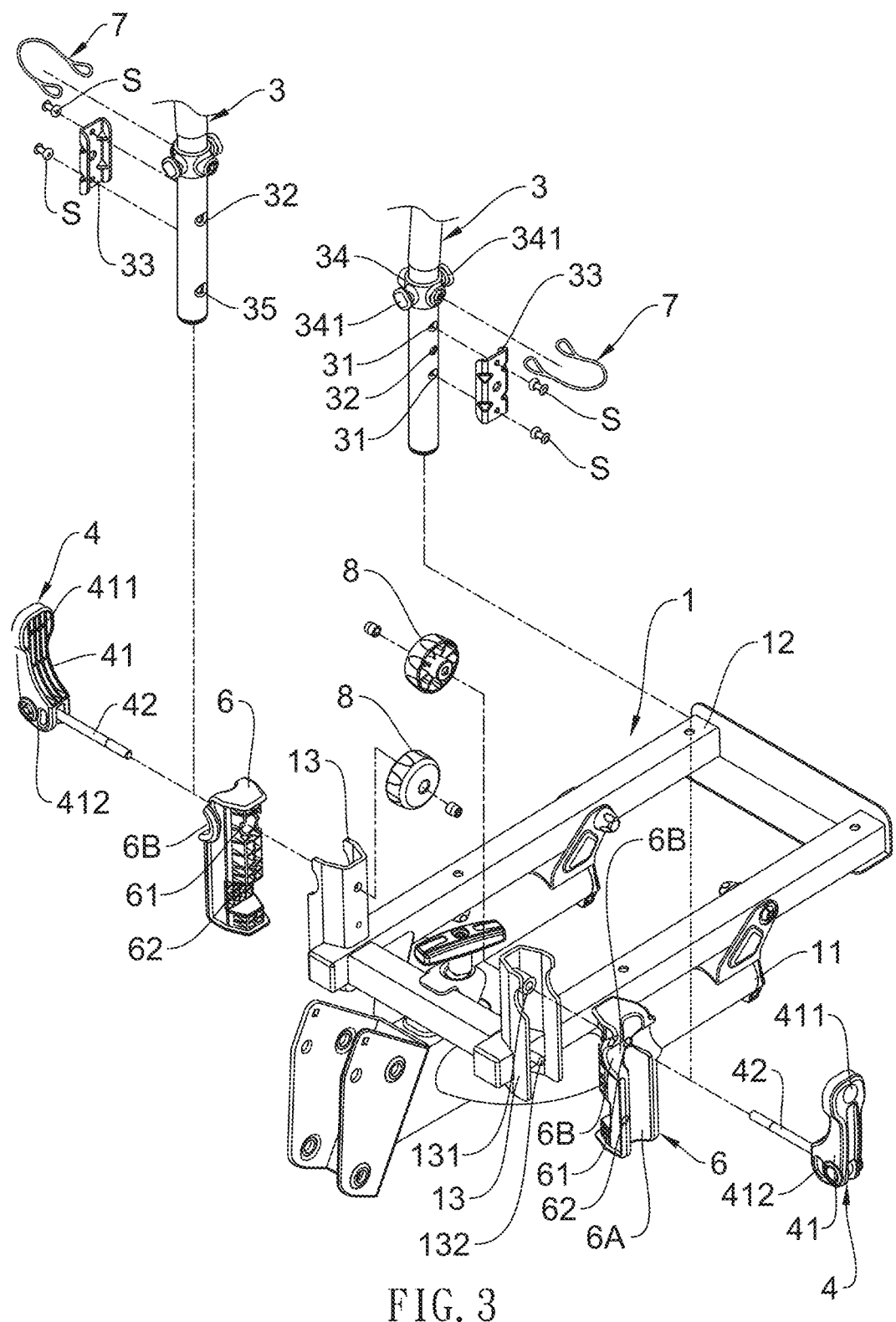
FIG. 3 is an exploded view of the bike rack of the present invention.
Figure 4:
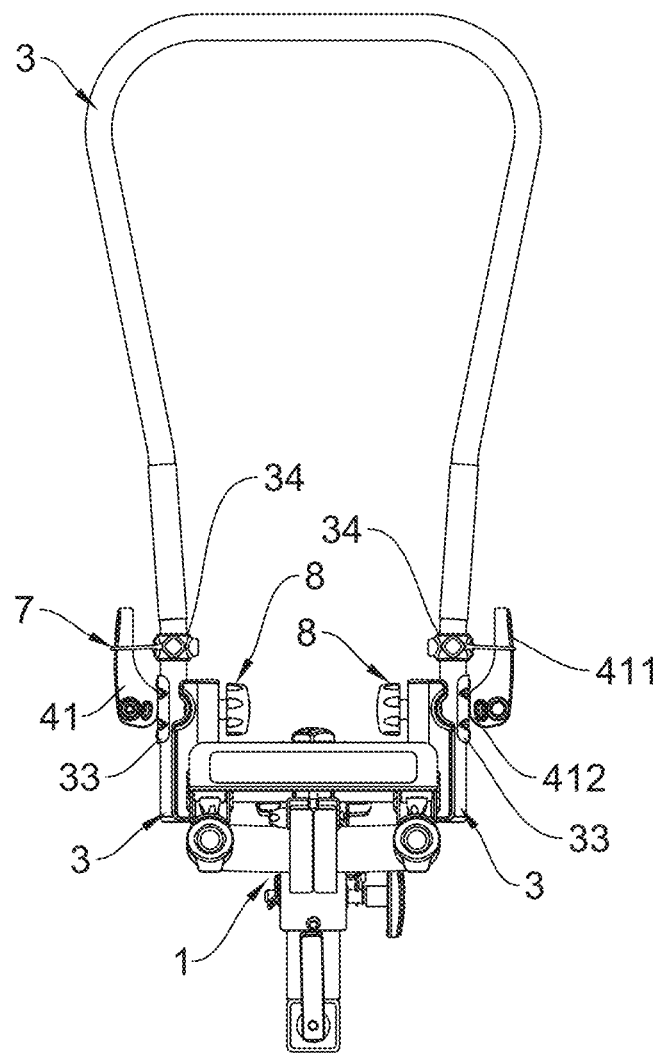
FIG. 4 is an end view to illustrate the locked state of the positioning frame of the present invention.
Figure 5:
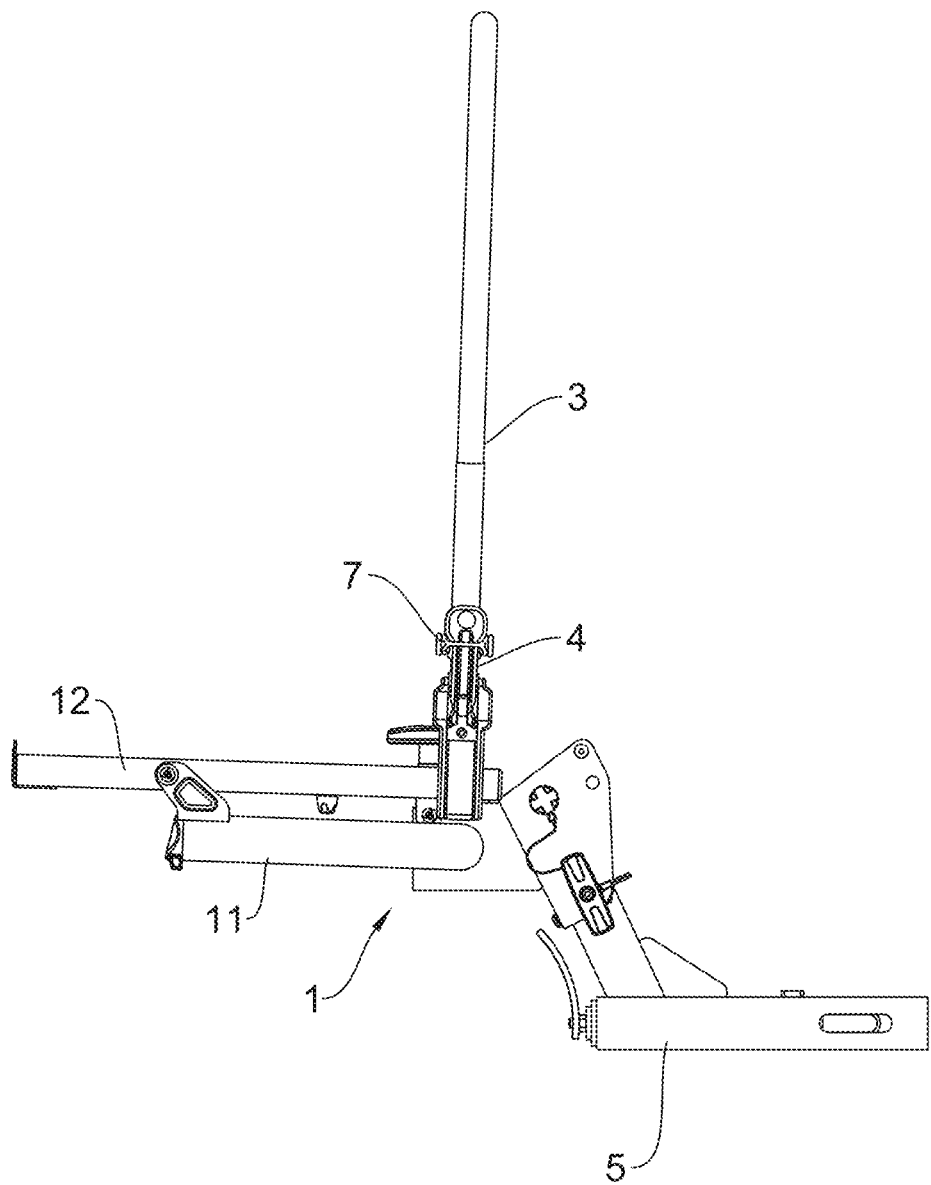
FIG. 5 is a side view of the bike rack of the present invention.
Figure 7:
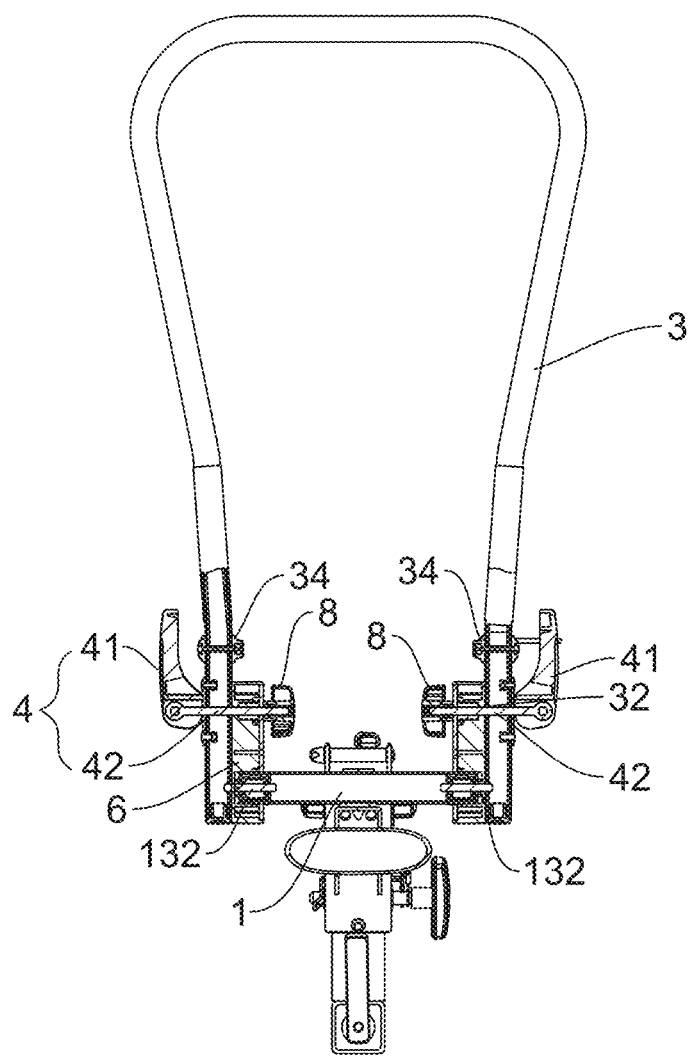
FIG. 7 is a partial cross-sectional view of the structure shown in FIG. 4.
Figure 8:
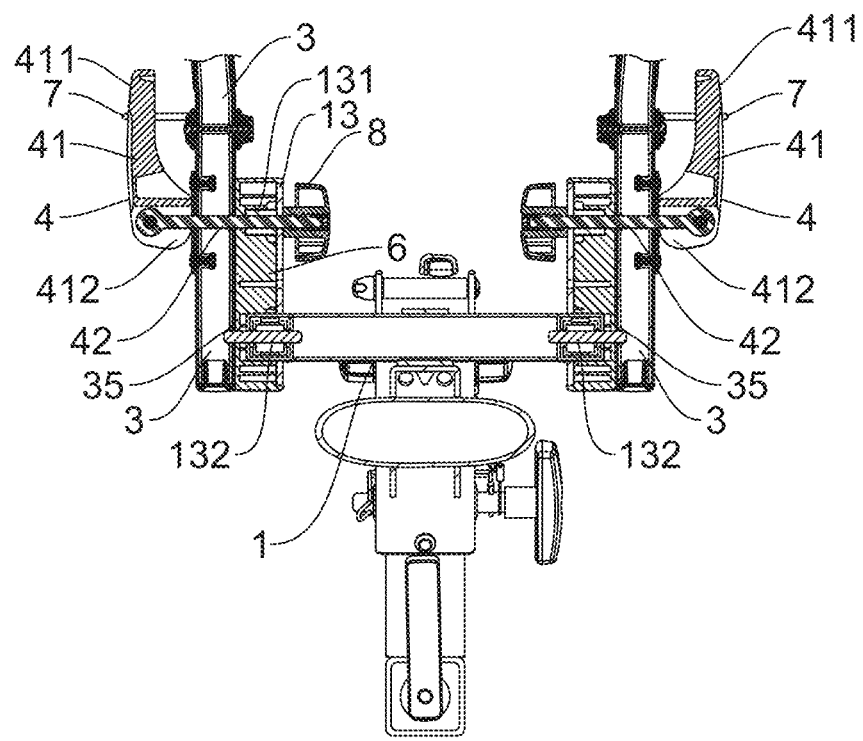
FIGS. 8 to 11 are diagrams of the usage steps of the bike rack of the present invention.

As shown in FIGS. 3 and 7, each of the connection plates (13) has an upper connection post (131) and a pin (132), and a limiter (6) is connected to each connection plate (13).

As shown in FIGS. 1 to 7, the positioning frame (3) is U-shaped and includes a U-shaped section and two extensions respectively extending from two distal ends of the U-shaped section. Each extension has two lock holes (31) and a perforation (32) which is located between the two lock holes (31). A spacer (33) is attached to an outside of each extension of the positioning frame (3). Two screws (S) pass through the spacer (33) and are connected to the lock holes (31) of each extension of the positioning frame (3).

Each set of quick-release devices (4) is engaged with the limiter (6) corresponding thereto, and includes a lever (41) and a connection shaft (42). The lever (41) has an operation end (411) and a protruding flange (412). The connection shaft (42) is connected to the protruding flange (412).

The positioning frame (3) includes a sleeve (34) mounted thereto. The sleeve (34) has two protrusions (341), and an elastic cord (7) is attached to the two protrusions (341). In a locked state, the elastic cord (7) is looped over the operation end (411) of the lever (41) to secure the lever (41).

Each limiter (6) is located in the connection plate (13) corresponding thereto and has an upper connection hole (61) located corresponding to the upper connection post (131), and a lower connection hole (62) located corresponding to the pin (132). Each limiter (6) has a vertical groove (6A) and a horizontal groove (6B), wherein the vertical groove (6A) accommodates the positioning frame (3) when the positioning frame (3) is positioned upright. The upper connection hole (61) is defined through an inner end of the horizontal groove (6B).

Each extension of the positioning frame (3) has a pin hole (35) located below a lowest one of the two lock holes (31). Each of the two extensions of the positioning frame (3) is accommodated in the vertical groove (6A) of the limiter (6) corresponding thereto. The connection shaft (42) of each quick-release device (4) passes through the perforation (32) and extends through the upper connection post (131), and the pin (132) is inserted into the pin holes (35) of the positioning frame (3) to enhance the stability of the positioning frame (3). A nut (8) is screwed onto a distal end of each connection shaft (42). When the lever (41) is pivoted, the protruding flange (412) fits against the spacer (33) to secure the positioning frame (3) to the base (1).

When in a usage state, as shown in FIGS. 1 to 5, 7 and 8, the positioning frame (3) is positioned upright and insert the extensions of the positioning frame (3) into the vertical grooves (6A) of the limiters (6). The connecting shaft (42) of each quick-release device (4) is inserted through the perforation (32) corresponding thereto. The connecting shaft (42) extends through the upper connecting post (131), and the pin (132) extends through the lower connecting hole (62) and into the pin hole (35) of the positioning frame (3). The nut (8) is screwed to the distal end of the connecting shaft (42). The lever (41) is pivoted so that the protruding flange (412) tightly fits against the spacer (33) to secure the positioning frame (3). The elastic cord (7) loops over the operation end (411) of the lever (41) to ensure that the positioning frame (3) is firmly mounted on the base (1) without wobbling.

Figure 6:
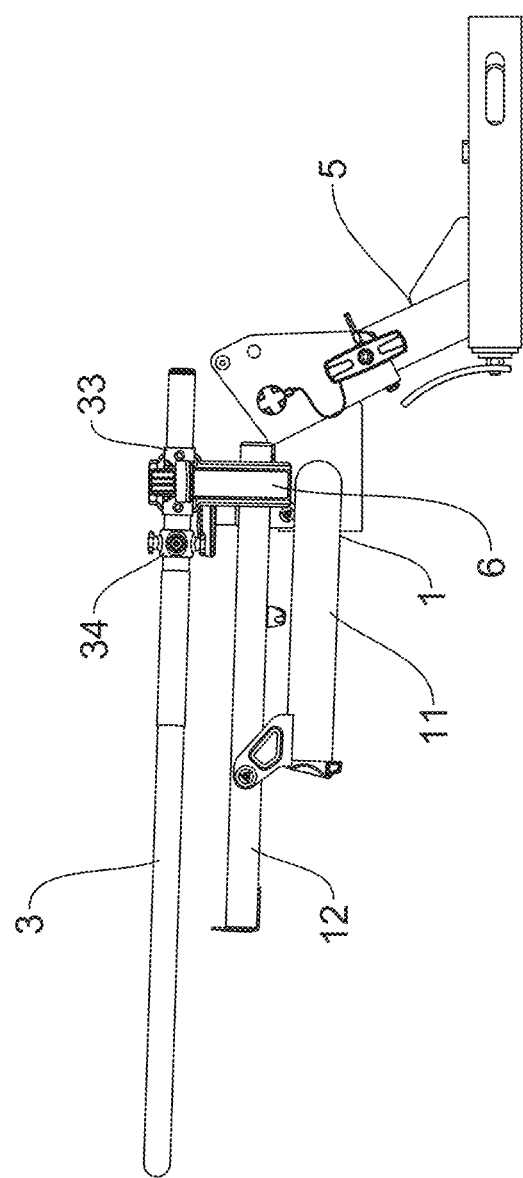
FIG. 6 is a side view to show the storage state of the present invention.
Figure 9:
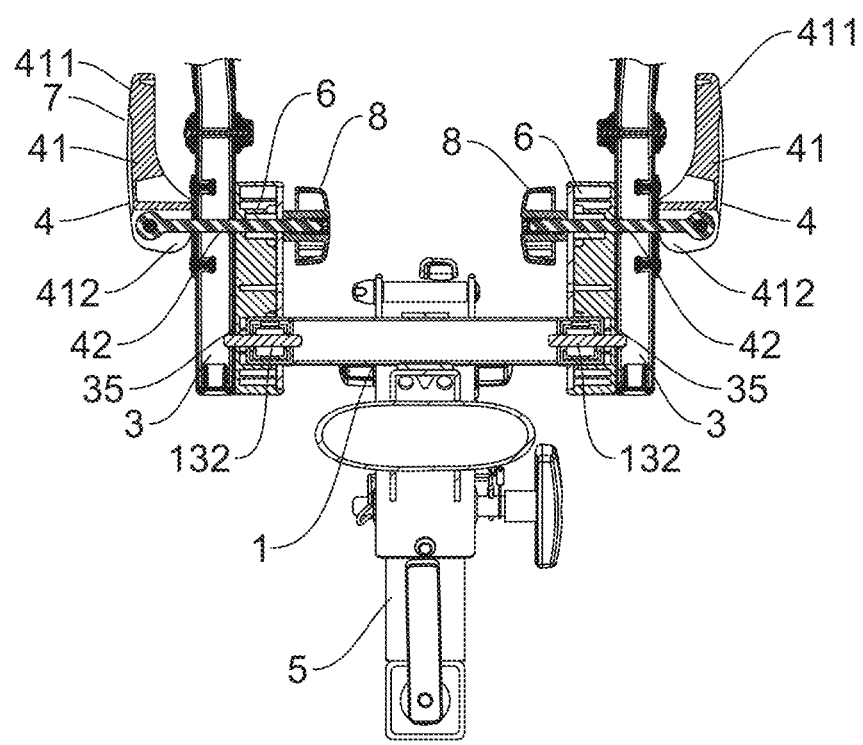
Figure 10:
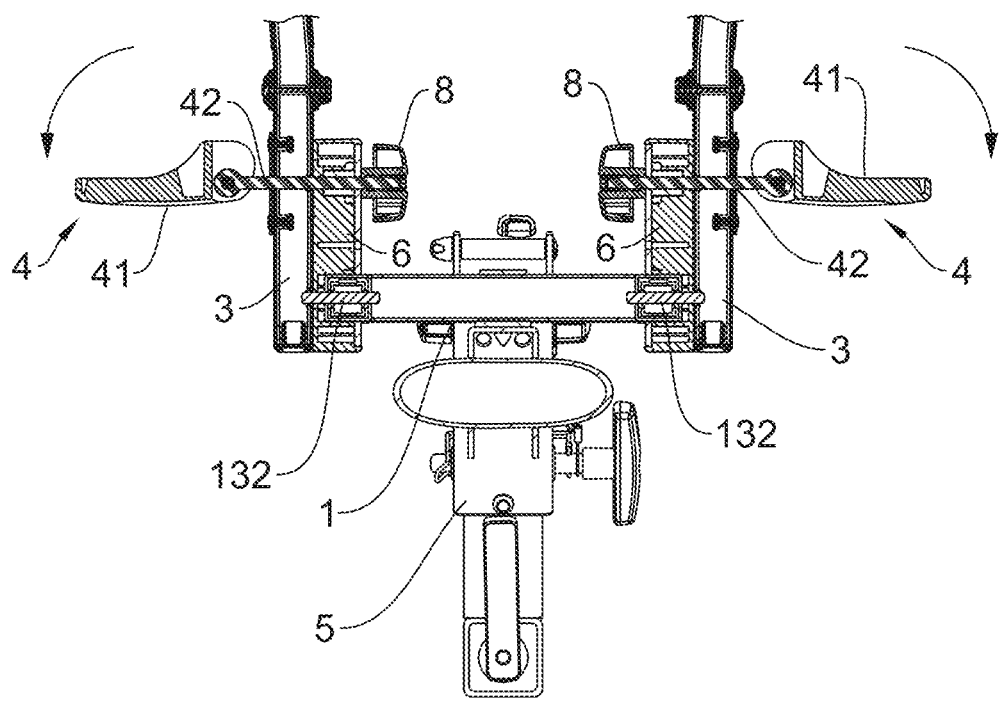
Figure 11:
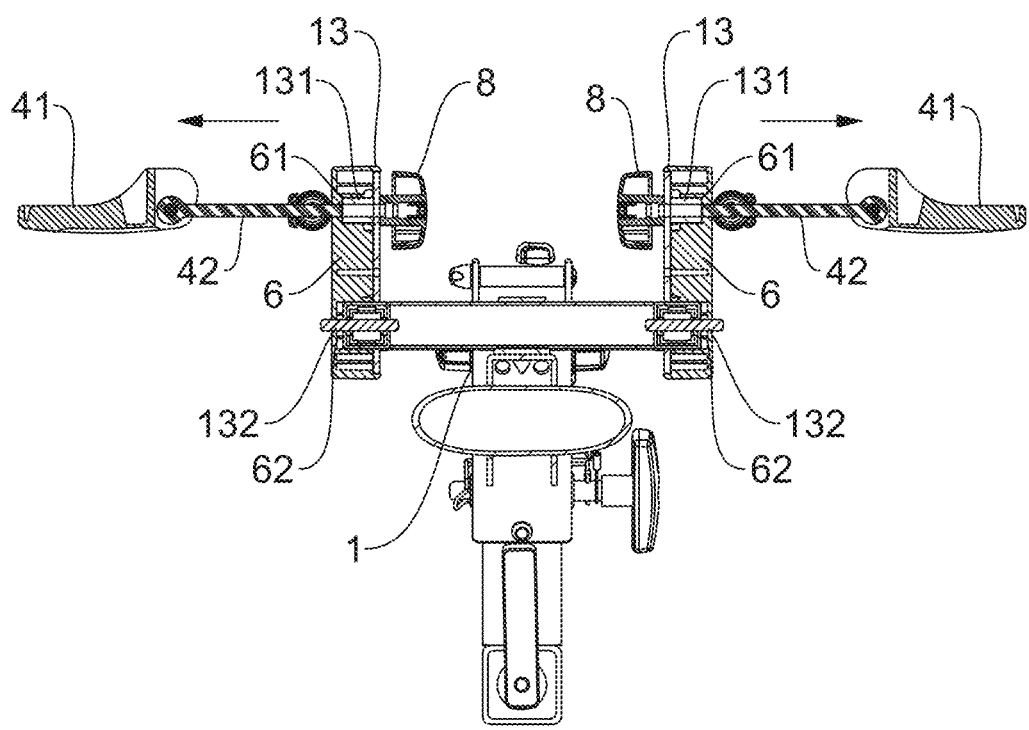

FIG. 6 and FIGS. 9 to 11 to illustrate the storage status. As illustrated in FIGS. 9 and 10, the elastic cord (7) is separated from the lever (41), and the lever (41) of the quick-release device (4) is pivoted outward to release the locked state of the positioning frame (3). As shown in FIG. 11, finally rotate the lever (41) so that the connecting shaft (42) exits the upper connecting post (131), allowing the positioning frame (3) to be removed. Then, as shown in FIG. 6, the positioning frame (3) can be assembled horizontally in the horizontal groove (6B) of the limiter (6) and clamped within the limiter (6) through the aforementioned quick-release device (4).

The present invention allows the positioning frame (3) to be quickly connected to the base (1) by the quick-release devices (4), providing convenience in use. Additionally, the design of the limiters (6) ensures that the positioning frame (3) does not wobble or become unstable during vehicle movement.

The pin (132) in the present invention increases the stability of the positioning frame (3) mounted on the limiter (6), ensuring that the overall structure remains stable and does not wobble.

While we have shown and described the embodiment in accordance with the present invention, it should be clear to those skilled in the art that further embodiments may be made without departing from the scope of the present invention.

What is claimed is:

1. A bike rack comprising:

a base, a positioning frame, and two sets of quick-release devices;

the base including a U-shaped bar and a support frame, the U-shaped bar is horizontally positioned, the support frame mounted a top of the U-shaped bar, the support frame being a quadrilateral frame with connection plates symmetrically positioned on two sides thereof;

each of the connection plates having an upper connection post and a pin, a limiter connected to each connection plate;

each limiter located in the connection plate corresponding thereto and having an upper connection hole located corresponding to the upper connection post, and a lower connection hole located corresponding to the pin, each limiter having a vertical groove and a horizontal groove, the vertical groove accommodating the positioning frame, the upper connection hole defined through an inner end of the horizontal groove;

the positioning frame being U-shaped and two extensions, each extension having two lock holes and a perforation which is located between the two lock holes, a spacer attached to an outside of each extension of the positioning frame, two screws passing through the spacer and connected to the lock holes of each extension of the positioning frame, each extension of the positioning frame having a pin hole located below a lowest one of the two lock holes;

each set of quick-release devices is engaged with the limiter corresponding thereto, each quick-release device including a lever and a connection shaft, the lever having an operation end and a protruding flange, the connection shaft connected to the protruding flange, and each of the two extensions of the positioning frame accommodated in the vertical groove of the limiter corresponding thereto, the connection shaft of each quick-release device passing through the perforation and extending through the upper connection post, and the pin inserted into the pin holes of the positioning frame, a nut being screwed onto a distal end of each connection shaft, when the lever is pivoted, the protruding flange fits against the spacer to secure the positioning frame to the base.

2. The bike rack as claimed in claim 1, wherein the base has at least one bike supporter.

3. The bike rack as claimed in claim 1, wherein each positioning frame includes a sleeve mounted thereto, the sleeve has two protrusions, an elastic cord is attached to the two protrusions, in a locked state, the elastic cord is looped over the operation end of the lever to secure the lever.

4. The bike rack as claimed in claim 1, wherein the base is adapted to be connected to a connection tube.

5. The bike rack as claimed in claim 1, wherein each of the two extensions of the positioning frame is accommodated horizontally in the horizontal groove of the limiter corresponding thereto, the positioning frame is positioned within the limiters by the quick-release devices.

* * * * *